May 22, 1923.

D. DANIEL

COTTON HARVESTER AND CONVEYER

Filed Sept. 14, 1920

WITNESSES

INVENTOR
Daniel Daniel.
BY
ATTORNEYS

May 22, 1923.
D. DANIEL
COTTON HARVESTER AND CONVEYER
Filed Sept. 14, 1920
1,455,908
3 Sheets-Sheet 2
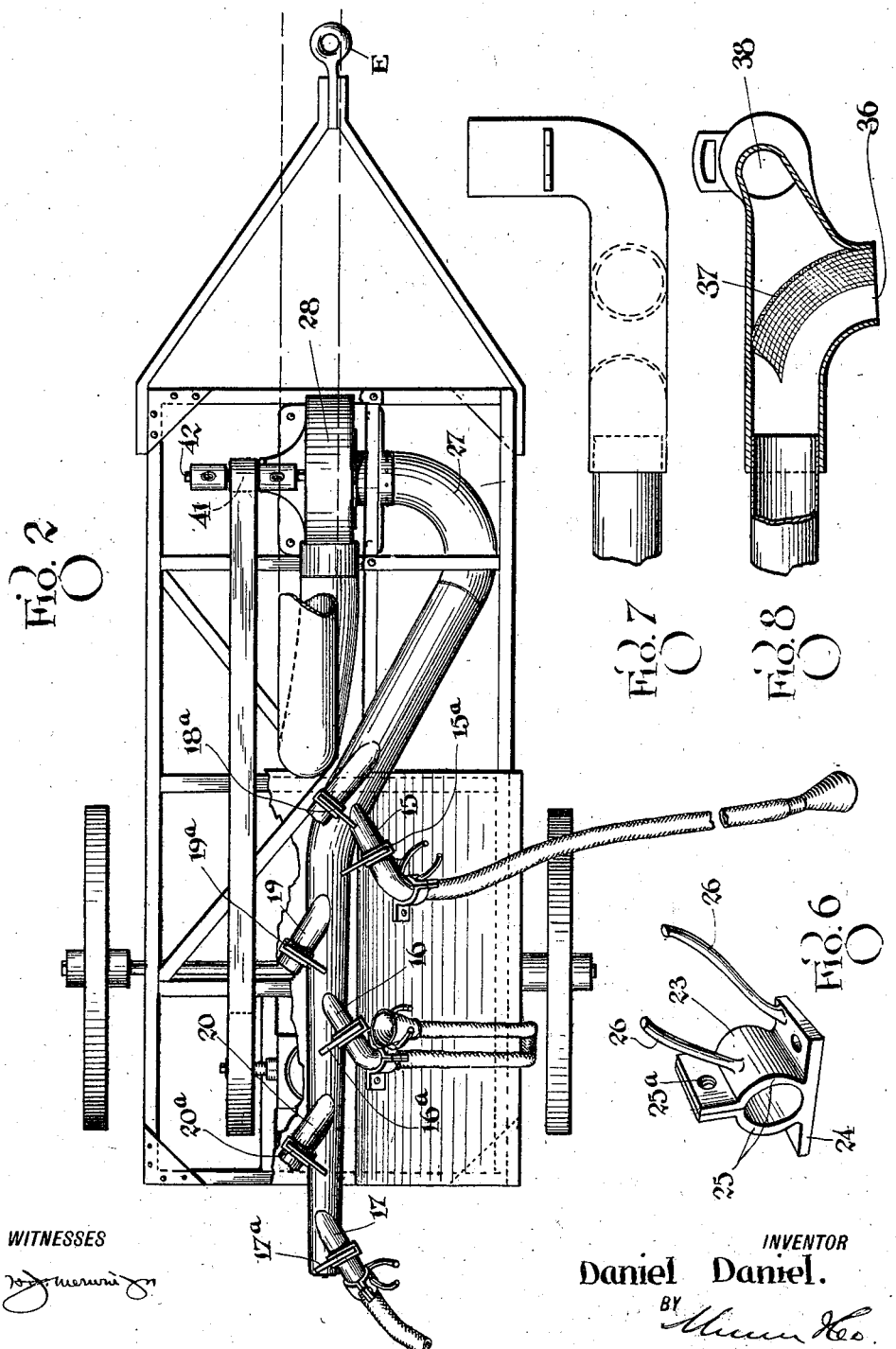

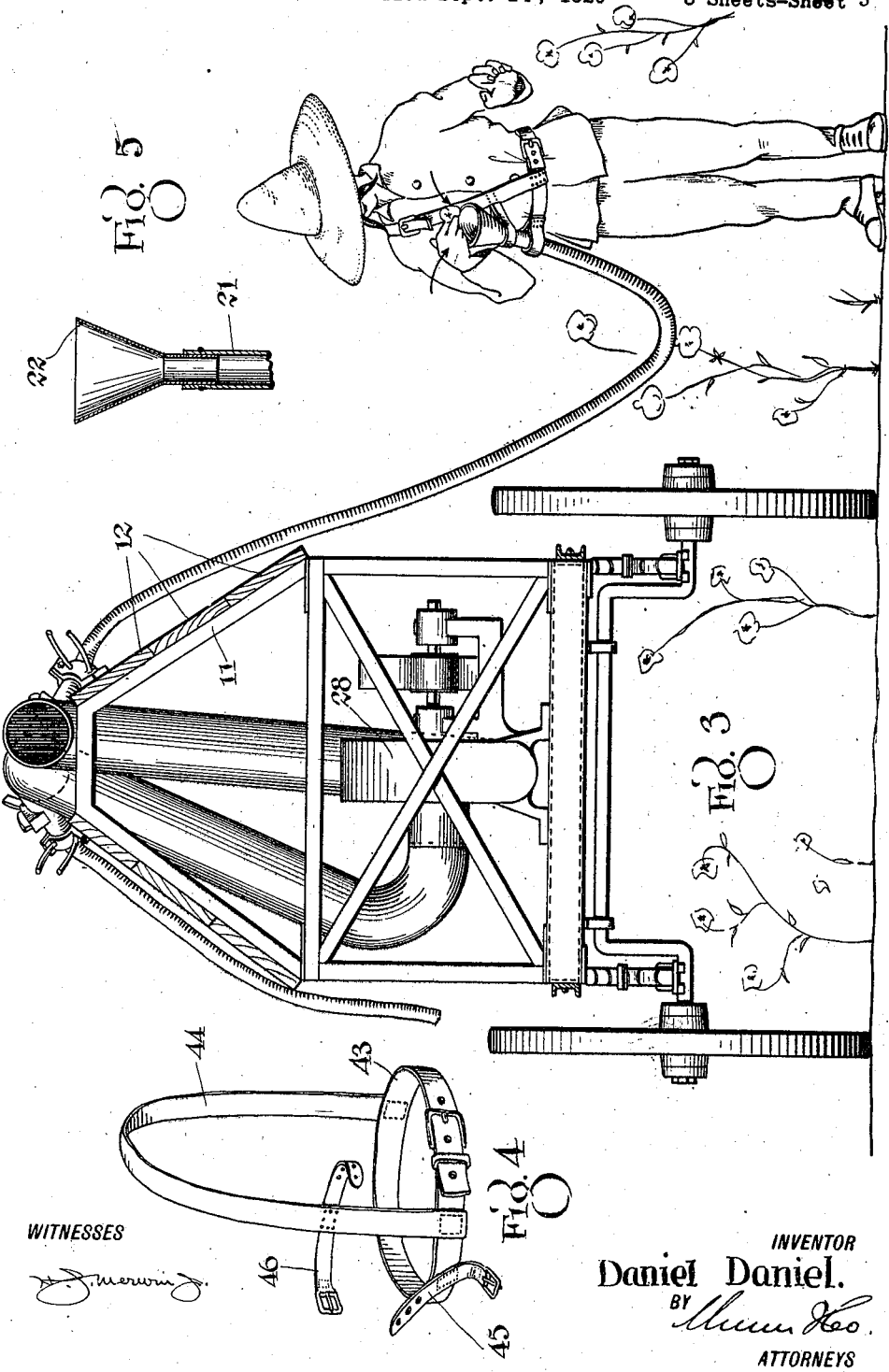
May 22, 1923.
D. DANIEL
COTTON HARVESTER AND CONVEYER
Filed Sept. 14, 1920
1,455,908
3 Sheets-Sheet 3

Patented May 22, 1923.

1,455,908

UNITED STATES PATENT OFFICE.

DANIEL DANIEL, OF LITTLE ROCK, ARKANSAS.

COTTON HARVESTER AND CONVEYER.

Application filed September 14, 1920. Serial No. 410,196.

*To all whom it may concern:*

Be it known that I, DANIEL DANIEL, a citizen of the United States, and a resident of Little Rock, in the county of Pulaski and State of Arkansas, have invented certain new and useful Improvements in Cotton Harvesters and Conveyers, of which the following is a specification.

The present invention relates to an improvement in cotton harvesters and conveyers.

The object of the invention is to provide an improved cotton harvester and conveyer of extremely simple and durable construction, reliable and effective in operation to perform the maximum amount of work at a minimum expense, and easy and inexpensive to manufacture.

Other objects and advantages of the invention reside in certain novel features of construction, combination and arrangement of parts as will be hereinafter more fully described and particularly pointed out in the appended claims reference being had to the accompanying drawings forming part of this specification, and in which:

Figure 2 is a plan view of a part thereof;

Figure 3 is a view, partly in transverse vertical section and partly in elevation;

Figure 4 is a detail perspective view of the harness for the picker;

Figure 5 is a detail view in section of the flexible hose funnel;

Figure 6 is a detail perspective view of the flexible hose clamp and holder;

Figure 7 is a fragmentary plan view of a portion of the discharge header; and

Figure 8 is a similar view in vertical section.

Figure 1:
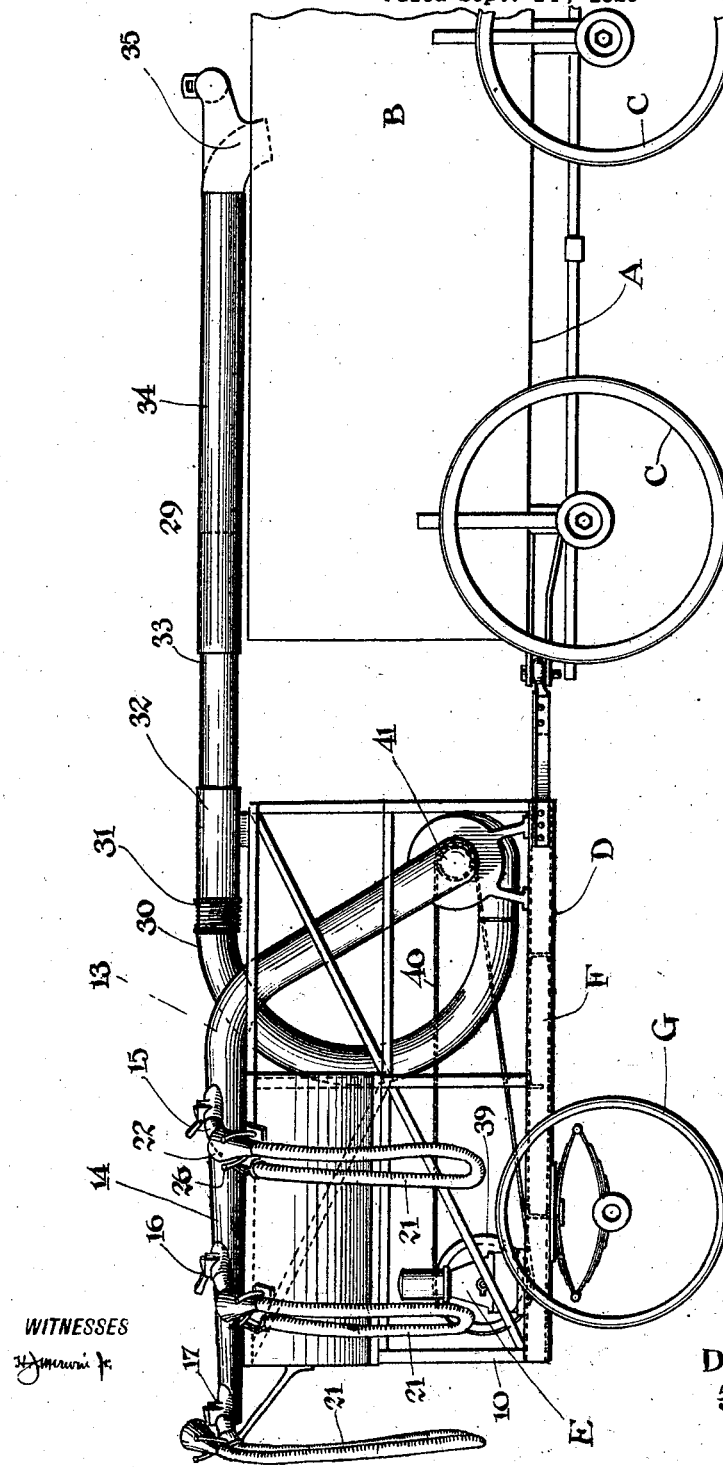
Figure 1 is a side elevational view of the apparatus embodying my invention.

Referring to the drawings wherein is shown the preferred embodiment of the invention, the letter A designates a cotton wagon which has a closed body B and which is mounted upon suitable wheels C. The cotton wagon A is drawn by any suitable means and in any suitable manner. A trailer D is coupled to the rear of the cotton wagon and is drawn thereby. The trailer embodies a chassis F and wheels G. A framework 10 is mounted upon the chassis and the trailer carries at its upper end a superstructure 11 of trapezoidal form. The sides of the superstructure 11 are covered by planking 12 for a purpose to be hereinafter described.

The suction pipe header 13 includes a manifold 14 of tapering form which is arranged upon the top of the trapezoidal superstructure 11. The manifold 14 includes three short branch pipes 15, 16 and 17 arranged along one side thereof and three short branch pipes 18, 19, and 20 arranged along the other side thereof. The branch pipes 15, 16 and 17 are alternately arranged or staggered with respect to the pipes 18, 19 and 20. Each of the branch pipes communicates with the main pipe of the manifold 14 as shown in the drawings, and each includes an air gate valve designated at $15^a$, $16^a$, $17^a$, $18^a$, $19^a$ and $20^a$, respectively.

An elongated flexible pipe designated at 21, is connected to each of the branch pipes 15, 16, 17, 18, 19 and 20, there being one flexible pipe for each branch pipe. The other end of each of the flexible pipes is provided with a funnel 22 which facilitates the delivery of the cotton to the flexible pipe 21. A combined clamp and holder, designated at 23, and as shown in detail in Figure 6, is provided for each of the flexible pipes and it consists of a base 24 which is bolted to the planking 12 adjacent the connection of the flexible pipe to the respective branch pipe. Spring clamp members 25 are preferably integrally formed with the base 24, and these clamp members embrace the flexible pipe adjacent its connection to the branch pipe. They are then secured in position by bolts or similar fastening means which extend through the openings $25^a$ formed in the clamp members. A holder is associated with the clamp members and consists of two complementary prongs 26 which constitutes a fork or hook to receive the funnel end of the flexible pipe and it is then seen that the entire weight of the flexible pipe is taken up by the combined clamp and holder when not in use, and when in use it is taken up by the clamp alone, the outer end being supported by the picker, as usual.

The suction header 13 extends downwardly and outwardly through the manifold 14 to the elbow 27 to one end of which it is connected. An exhauster or fan pump 28 is connected to the other end of the elbow 27 and is arranged to exhaust the air from the suction header 13 and its manifold 14 and consequently from the branch pipes and the flexible pipes 21 connected thereto. A discharge header, designated generally at 29, is connected to the discharge outlet of the exhauster or fan pump and includes an upwardly curved section 30 connected by a flexible coupling 31 to the short section 32 which has a reduced extension 33 telescoping in the end section 34. The extremity of the end section is downwardly curved, as at 35, and enters the cotton wagon A. Adjacent the downwardly curved exit 36 for the cotton, a screen 37 is provided which arrests the path of the cotton and throws it to the cotton exit 36. The end section 34 is also provided with a vent 38 for the air which passes through the screen 37 and thence outwardly to the atmosphere.

Means is provided for actuating the exhauster or fan pump and includes an engine E, the shaft of which carries a large pulley 39 over which a belt 40 is run, the other end of the belt 40 being run over a small pulley 41 which is connected to the fan shaft 42 of the exhauster.

A harness is provided for the picker to facilitate the carrying of the flexible pipe, and as shown in detail in Figure 4 and in use in Figure 3, includes a belt 43 which encircles the body of the picker and a shoulder strap 44. Short straps 45 and 46 are carried by the belt and shoulder strap, respectively and engage and hold the flexible pipe in position.

In operation, the engine E having been started and the fan of the exhauster speeded up, the air is exhausted from the suction header and discharged through the discharge header 29. The air gate valve of the respective branch pipe is opened by the picker as he takes the flexible pipe from its holder so that the flexible pipe is in communication with the vacuum of the suction header. The picker delivers the cotton to the funnel of the flexible pipe and the vacuum carries it through the flexible pipe, branch pipe and the suction header to the fan pump. The cotton travels through the pump and then through the discharge header 29. In the discharge header 29 it encounters the screen 37 and is deflected downwardly thereby to be discharged through the cotton exit 36 to the cotton receiver, the air escaping through the screen and the vent 38.

I claim:

1. In an apparatus of the character described, in combination a cotton wagon, a rigid superstructure thereon, a fan exhauster, a suction header connected thereto and having a manifold communicating therewith, said manifold supported longitudinally on said superstructure, a plurality of branch pipes communicating with said manifold, a flexible pipe connected with each of said branch pipes and means rigidly mounted on the superstructure and having rigid and positive engagement with the inner ends of the flexible pipes for supporting said inner ends of the pipes independently of the manifold whereby to relieve the manifold and branch pipes of strain.

2. In an apparatus of the character described, in combination with a fan-exhauster, a suction header connected thereto and having a manifold communicating therewith, a plurality of branch pipes communicating with the manifold, a flexible pipe connected with each of said branch pipes, and means for holding the flexible pipes independently of the manifold, said means including a clamp rigidly supporting the inner end of each flexible pipe, and a fork for detachably supporting the outer end of such pipe.

3. In an apparatus of the character described, a cotton wagon, a superstructure provided thereupon and including a top and sides, a suction header having a manifold communicating therewith and arranged upon the top of said superstructure, a plurality of branch pipes communicating with the manifold and arranged along each side thereof, a flexible pipe connected with each of said branch pipes, and means for supporting said flexible pipes upon the sides of the superstructure and independently of the manifold and including means permanently engaging the end of each flxible pipe that is connected to the branch pipe and means adapted to releasably engage the free end of each flexible pipe.

4. In an apparatus of the character described, in combination with a receiver for the cotton and a fan exhauster, a suction header including a tapering manifold connected with one side of the fan exhauster and having a plurality of lateral branch pipes, the branch pipes being arranged to extend outwardly from each side of the manifold, said branch pipes along one side of the manifold being alternately arranged with respect to the pipes of the other side, a flexible pipe connected with each of said branch pipes and a discharge header connected to the outlet side of the fan exhauster and having a cotton exit to said receiver.

5. In an apparatus of the character described, in combination with a cotton wagon, and a receiver for the cotton, and a fan exhauster, a suction header including a tapering manifold longitudinally disposed with respect to the cotton wagon, said manifold connected with one side of the fan exhauster, and having a plurality of branch pipes extending laterally and at an acute angle at opposite sides of the manifold, said branch pipes also arranged in staggered relation, a flexible pipe connected with each of the branch pipes, and a discharge header connected to the outlet side of the fan exhauster, and having cotton exit to the said receiver.

DANIEL DANIEL.